R. S. TROTT.
DETACHABLE COUNTERBALANCE WEIGHT FOR MOTOR CRANK SHAFTS.
APPLICATION FILED SEPT. 24, 1919.
1,350,270.
Patented Aug. 17, 1920.
2 SHEETS—SHEET 1.
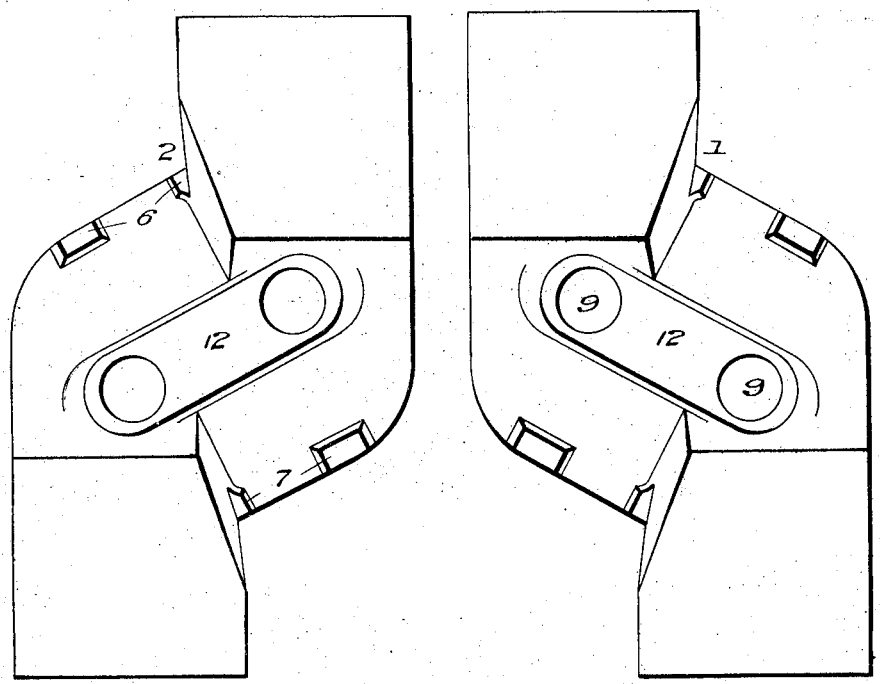
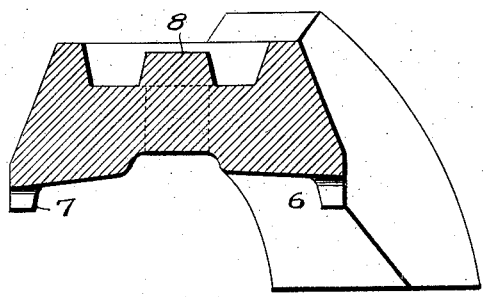
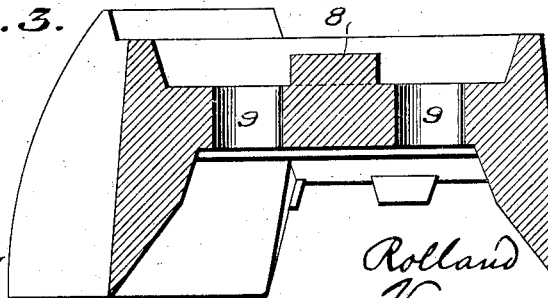

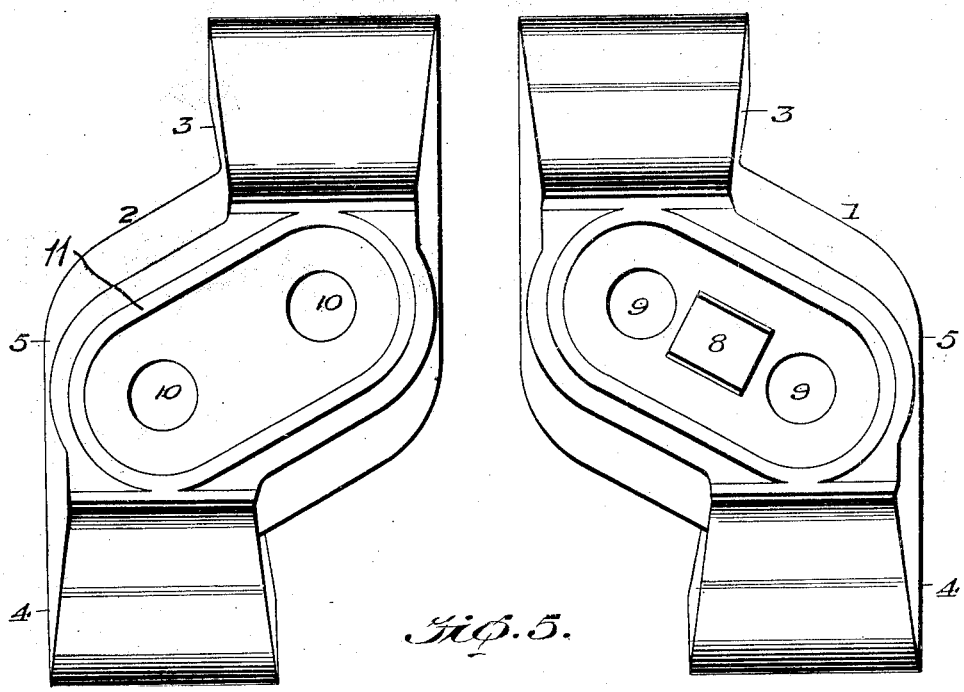
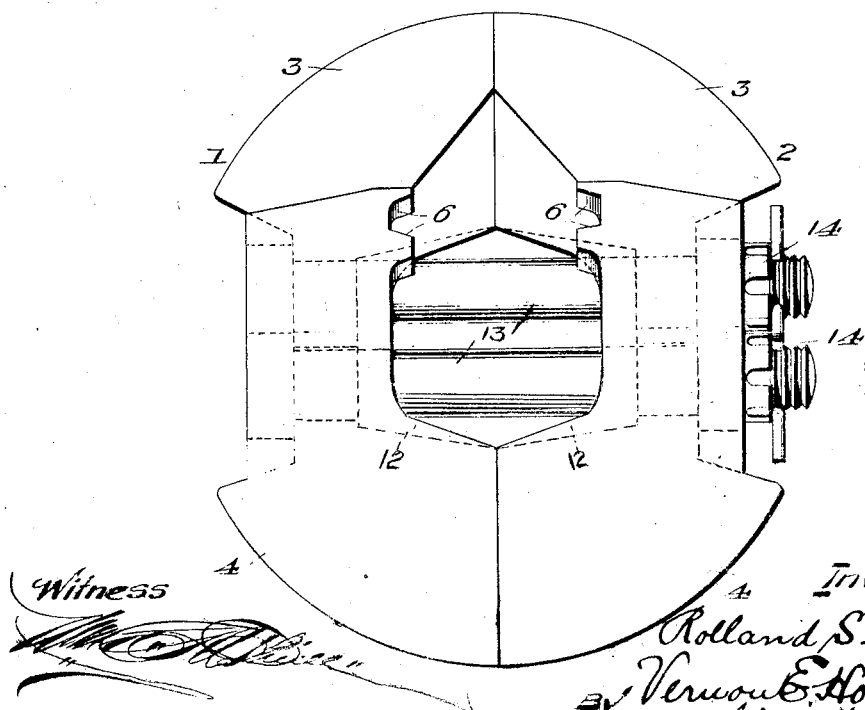

UNITED STATES PATENT OFFICE.

ROLLAND S. TROTT, OF DENVER, COLORADO.

DETACHABLE COUNTERBALANCE-WEIGHT FOR MOTOR CRANK-SHAFTS.

1,350,270.  Specification of Letters Patent.  Patented Aug. 17, 1920.

Application filed September 24, 1919. Serial No. 325,864.

*To all whom it may concern:*

Be it known that I, ROLLAND S. TROTT, a citizen of the United States, residing at Denver, in the county of Denver and State of Colorado, have invented certain new and useful Improvements in Detachable Counterbalance-Weights for Motor Crank-Shafts, of which the following is a specification.

My invention relates to detachable counterbalances for motor crankshafts, being an improvement on my pending application filed May 2, 1919, Serial No. 294,236.

The object of my present invention is to facilitate the application of the counterbalances to the arm of the crankshaft by doing away with the necessity of providing a groove in each of the counterbalances which is adapted to receive the crankshaft arm.

A further object is to reduce the thickness of the metal centrally of each weight to reduce the centrifugal effect at that point upon the fastening bolts.

A further object is to eliminate the sharp change of section that occurs along the corner of the grooves in my previous invention, and which results in breaking of the castings at this change of section which is where the greatest strain comes when clamping the weights to over-sized shaft-arms so large that they seat on the sides of the groove instead of the bottom, producing a wedge action that is tremendously greater than any possible strain that can come on a properly fitted weight.

A further and final object is to provide a construction for detachable counterbalances for motor crankshafts which will permit of their being individually fitted quickly and easily to each individual crankshaft so that the counterbalances may be made to fit the smallest size of shafts and yet be quickly and perfectly fitted to the over-sized shafts.

Figure 1 is a view of two parts side by side of a counterbalance viewed from the side that clamps against the shaft arm.

Fig. 2 is a section through the same along the length of the shaft arm.

Fig. 3 is a section of the weight at right angles to the length of the shaft arm.

Fig. 4 is a view similar to Fig. 1, showing the relative opposite sides of said counterbalance weights.

Fig. 5 shows the two parts of the counterbalance facing each other as they are when clamped firmly together for shipment.

In manufacturing my former counterbalance weight I have found that there is such a great variation in the forged portions of the commercial crankshaft that there is no possibility of making any groove that will fit every shaft of even one make of motor without special individual fitting. The result has been that I have had to make the groove that fits over the shaft arm wide enough to receive even the very largest size arm that can be met with in the certain make of motor crankshaft which a certain size of weight is supposed to fit; otherwise the weights were apt to become broken in two along the line of the corner of the grooves when being clamped to the arm of the crankshaft, hence the groove became a very free fit for the ordinary and undersized arms.

The weight as a whole consists of two members hereinafter referred to as the bolt half 1 and the nut half 2. Each half preferably consists of two weights 3 and 4 connected together by an oblique web 5, the webs of which are adapted to extend transversely of the crankshaft arm and are provided on their inner sloped faces with four small lugs 6—6 and 7—7. These lugs are engaged to fit the smallest undersized shaft arm and for the ordinary or oversized shaft the four small lugs may be filed down until the crank shaft will fit properly there between. It will be seen that the bolt half 1 of the counterbalance is provided with a block 8 passed between the two bolt holes 9—9 so as to register against a face of the head of each clamping bolt and prevent same from turning. The holes 9—9 are a close fit for the clamping bolts. The nut half 2 is provided with holes 10—10 for the clamping bolts and these holes are rather free fit for the clamping bolts so that the weights may place themselves properly regardless of misalinement in the proper position of the bolt holes. The outside face of each web is countersunk and is surrounded by ribs 11 which acts to protect the nuts and bolt heads, and strengthen the casting.

The inner side of each weight 3 from which project the lugs 6—6 and 7—7 is provided with a depression which slopes both ways toward the center at an angle to fit the double taper of the edges of the crankshaft arm. At the center of this depression is a recess 12, which permits shifting of the weight along the shaft arm and which runs longitudinally of the web and at right angles to the shaft arm and includes the clamping bolt holes 9—9 and 10—10; thus the depression which allows shifting the weight along the arm also decreases the thickness of the metal which must be drilled through in drilling the clamping bolt holes.

It will thus be seen that through my new construction the time and expense of cleaning the corners of the lugs is saved as they are to be file fitted for each individual crankshaft by the purchaser. The weight at the center of the counterbalance has been reduced so that with the same total weight of metal a greater balance and flywheel effect may be obtained. The thickness of the metal to be drilled has been reduced to about 50% of that required in my former construction. Furthermore, there is no sharp change in section such as existed along the corner of the groove in my former construction so that this weak spot in the casting has been eliminated. No wedge effect is possible that will be great enough to break the weight as the worst carelessness in fitting can only result in cracking off one or more of the alinement lugs, and finally my new construction provides a counterbalance weight which will be closely fitted to all varieties of crankshaft sizes easily when they are installed and at the same time this new counterbalance may be exactly positioned by moving along the shaft or by proper shimming just as in my former invention.

I claim:

1. A crankshaft counterbalance including two members having weighted outer ends and an oblique center connecting the weighted ends, the inner faces of the oblique centers provided with lugs between which the oblique arms of the crankshaft are received with the weighted ends of each member disposed on the opposite sides of the arms, bolts extending transversely of the centers of the two members for securing the counterbalances to the arms of the crank shaft.

2. A crankshaft counterbalance including two members having weighted outer ends and an oblique center connecting the weighted ends, the inner faces of the oblique centers provided with lugs between which the oblique arms of the crankshaft are received with the weighted ends of each member disposed on the opposite sides of the arms, bolts extending transversely of the centers of the two members for securing the counterbalances to the arms of the crankshaft and common means for preventing the bolts from turning.

3. A crankshaft counterbalance including two members having weighted outer ends and an oblique center connecting the weighted ends, the inner faces of the oblique centers provided with lugs between which the oblique arms of the crankshaft are received with the weighted ends of each member disposed on the opposite sides of the arms, bolts extending transversely of the centers of the two members for securing the counterbalances to the arms of the crankshaft, cavities in one of the centers for receiving the bolt heads and a web arranged in the cavities for preventing the bolts from turning.

4. A crankshaft counterbalance including two members having weighted outer ends and an obliquely disposed center connecting the weighted ends, the inner faces of the oblique centers sloping inwardly and recessed longitudinally thereof to bridge the thickest portion of the crankshaft arm, and means extending transversely of the webs for securing the counterbalance to the crankshaft arm.

5. A crankshaft counterbalance including two members having weighted outer ends and an obliquely disposed center connecting the weighted ends, the inner faces of the oblique centers sloping inwardly and recessed longitudinally thereof to bridge the thickest portion of the crankshaft arm, said sloping surfaces provided with lugs on the outer edges thereof between which the oblique arm of the crankshaft is received with the weighted ends of each member disposed on opposite sides of the arm and bolts extending transversely of the centers of the two members for securing the counterbalances thereon.

6. A crank shaft counterbalance including two members having weighted outer ends and an obliquely disposed center connecting the weighted ends, the inner faces of the oblique centers sloping inwardly and recessed longitudinally thereof to bridge the thickest portion of the said crankshaft arm, said sloping surfaces provided with lugs on the outer edges thereof between which the oblique arm of the crankshaft is received with the weighted end of each member disposed on opposite sides of the arm, bolts extending transversely of the centers of the two members for securing the counterbalances thereon, cavities in one of the centers for receiving the bolt heads and a web arranged in the cavities for preventing the bolts from turning.

7. A crank-shaft counterbalance comprising two opposed weights for application to the opposite edges of the arm of the crankshaft, means for clamping said members together against the edges of said crank-shaft, and alinement lugs arranged on the inner faces of said weights, between which the arms are received.

8. A crank-shaft counterbalance comprising two members, each composed of a pair of joined opposed weights for application to the opposite edges of the arm of a crankshaft, means extending transversely of the crankshaft for clamping said two members together against the edges of said crankshaft, and means projecting from the inner faces of the weights between which the arm of the crank-shaft is received and alined.

9. A crank-shaft counterbalance comprising two opposed weights for application to the opposite edges of the arm of the crankshaft, means for clamping said members together against the edges of said crank-shaft, and means projecting from the inner faces of the weights between which the arm of the crank-shaft is received and alined.

In testimony whereof I affix my signature.

ROLLAND S. TROTT.